United States Patent
Holmes et al.

(10) Patent No.: US 7,561,932 B1
(45) Date of Patent: Jul. 14, 2009

(54) SYSTEM AND METHOD FOR PROCESSING MULTI-CHANNEL AUDIO

(75) Inventors: Stephen G. Holmes, Seattle, WA (US);
Mark A. Pereira, Livermore, CA (US);
Micah S. Stroud, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 768 days.

(21) Appl. No.: 10/642,678

(22) Filed: Aug. 19, 2003

(51) Int. Cl.
*G06F 17/00* (2006.01)
*H04B 3/00* (2006.01)

(52) U.S. Cl. .............................. 700/94; 381/77; 381/81

(58) Field of Classification Search .................. 381/18, 381/19, 20, 21, 80, 81, 82, 85, 306, 307, 381/310
See application file for complete search history.

(56) References Cited

U.S. PATENT DOCUMENTS

| | | | |
|---|---|---|---|
| 5,835,895 A * | 11/1998 | Stokes, III | 704/500 |
| 5,860,060 A * | 1/1999 | Li et al. | 704/500 |
| 5,875,250 A | 2/1999 | Kuo et al. | |
| 6,016,515 A * | 1/2000 | Shaw et al. | 719/321 |
| 6,285,767 B1 * | 9/2001 | Klayman | 381/17 |
| 6,381,335 B2 | 4/2002 | Juszkiewicz et al. | |
| 6,498,857 B1 * | 12/2002 | Sibbald | 381/310 |
| 6,647,119 B1 * | 11/2003 | Slezak | 381/17 |
| 7,440,810 B2 * | 10/2008 | Konetski | 700/94 |
| 2004/0064210 A1 * | 4/2004 | Puryear et al. | 700/94 |

OTHER PUBLICATIONS

"What is Jack?", http://jackit.sourceforge.net, Apr. 21, 2003, 3 pgs.

* cited by examiner

*Primary Examiner*—Curtis Kuntz
*Assistant Examiner*—Joseph Saunders, Jr.
(74) *Attorney, Agent, or Firm*—Cooley Godward Kronish LLP (57) ABSTRACT

A user can assign different audio data streams to different output channels of a single audio card using substantially conventional APIs, device drivers, and Audio Codec Interfaces (ACIs). An Application Processing Unit (APU) sequences audio data streams in accordance with a user's output channel assignment.

9 Claims, 7 Drawing Sheets

| APP | DATA | CHANNEL |
|---|---|---|
| 1 | AB/CD/... | 01 |
| 2 | EF/GH/... | 45 |
| 3 | IJ/KL/... | 23 |

*FIG. 6A*

| APU 215 OUTPUT | A B I J E F / C D K L G H |
|---|---|
| DEVICE SEQUENCE | 0 1 2 3 4 5 / 0 1 2 3 4 5 |

*FIG. 6B*

| DATA INPUT 1 | DATA INPUT 2 | OUTPUT |
|---|---|---|
| AB/CD/... | EF/GH/... | ZY/VW/... |

*FIG. 7*

SYSTEM AND METHOD FOR PROCESSING MULTI-CHANNEL AUDIO

BACKGROUND

The invention relates generally to the field of data processing. More specifically, the invention relates to a system and method for processing multi-channel audio.

Music players, game stations, and other computer-based applications that output audio data are becoming more prevalent. Various systems and methods are known for interfacing audio applications on a computer or other processor to speakers, microphones, or other audio devices. For example, sound cards have been developed which support the input and/or output of one or more analog and/or digital channels. Some sound card designs have evolved into defacto standards, such as Creative Technology Ltd's Sound Blaster products. Moreover, a variety of application program interfaces (APIs) have been developed for Windows and other Operating Systems (OS) to provide standardized interfaces between applications and standardized sound card configurations.

Known systems and methods for processing multi-channel audio have various disadvantages, however. For example, multi-channel audio sources may require multiple sound cards or other interfaces to output audio. For instance, a six-channel source may require three separate stereo sound cards (having 2 channels each) to output the six channel audio data.

In addition, audio systems may be configured to provide output for only a single application. Thus, where multiple applications are operating simultaneously, and where two or more of the applications produce audio output, multiple sound cards may be required to output the audio. This is undesirable due to the additional expense and space required to host multiple sound cards. Such a scheme also precludes mixing two channels on the sound card where audio data in each of the two channels originate in different applications.

Therefore, a need exists for a system and method that enable a single audio card to simultaneously output data from multiple sources. In addition, the system and method should be flexible enough that a user can selectably associate different audio streams with different output channels on the single audio card. Moreover, a system and method is needed that enables selective mixing of two or more audio stream inputs.

SUMMARY OF THE INVENTION

Embodiments of the invention enable a user to assign different audio data streams to different output channels of a single audio card using substantially conventional APIs, device drivers, and Audio Codec Interfaces (ACIs). Embodiments of the invention provide an Audio Processing Unit (APU) to sequence audio data streams in accordance with a user's output channel assignment.

The features and advantages of the invention will become apparent from the following drawings and detailed description.

BRIEF DESCRIPTION OF THE DRAWINGS

Embodiments of the invention are described with reference to the following drawings, wherein.

DETAILED DESCRIPTION

First, an exemplary architecture is described below with reference to FIGS. 1 and 2. Then, user interaction is described with reference to FIGS. 3 and 4, and system operation is described with reference to FIGS. 5-7. Sub-headings are used below for organizational convenience only; any particular feature may be described in more than one section.

Architecture

Figure 1:
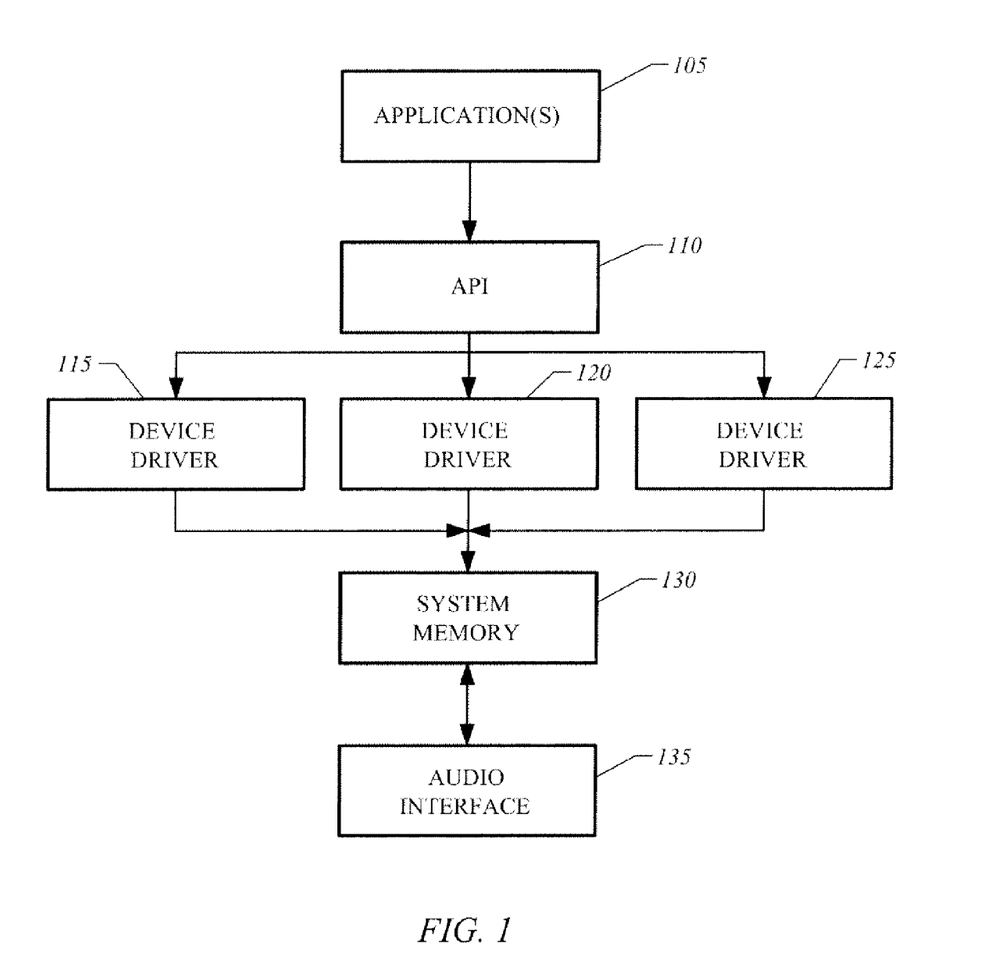
FIG. 1 is a block diagram of a functional system architecture, according to one embodiment of the invention.

FIG. 1 is a block diagram of a functional system architecture, according to one embodiment of the invention. As shown therein, one or more applications 105 provide audio data streams to device drivers (also referred to herein as devices) 115, 120 and 125 via application program interface (API) 110. Data formatted by the device drivers 115, 120, and/or 125 is provided to a system memory 130, where the audio data is accessed by audio interface 135 for output.

The application(s) 105 may be or include, for example, a media player for playing compact disc (CD) content, game software, video players outputting an audio track, and/or other software providing audio data as an output. API 110 provides an interface between the application(s) 105 and device drivers 115, 120 and 125. The API 110 may be or include, for instance, MultiMedia Extension (MME), Direct-Sound, Audio Streaming Input/Output (ASIO), GigaSampler-Interface (GSIF), or other software providing an interface for the application(s) 105. Device drivers 115, 120 and/or 125 format data for target hardware outputting audio data, and may be tailored to unique Operating System (OS) environments. Advantageously, device drivers 115, 120 and 125 may actually be a single device driver that appears to the OS as multiple device drivers. Thus, as used herein, the device drivers can be viewed as enabling virtual devices. The system memory 130 may be or include random access memory (RAM), or other buffer, cache or other memory device capable of temporarily storing audio data. Audio interface 135 may be or include an integrated circuit, a multi-chip module (MCM), sound card or other circuit card assembly (CCA), or other component or assembly to provide an interface to audio devices such as speakers, microphones, audio recorders, audio players, or other audio input or output devices (sometimes referred to herein as a sound card).

Other embodiments of the audio system depicted in FIG. 1 may also be implemented, according to design choice. For example, some embodiments may not require API 110, where the device drivers 115, 120 and/or 125 are more tightly coupled to the application(s) 105 (e.g., where device drivers 115, 120, and/or 125 use Windows Driver Model kernel streaming to provide a direct hardware interface to applications without using an API). In addition, embodiments of the invention contemplate that there may be two or more device drivers 115, 120 and/or 125. In other words, there need not be a quantity of three device drivers. Moreover, in some embodiments, the system and memory 130 may be located on the audio interface 135. Further, although not shown in FIG. 1, the architecture can be configured so that applications(s) 105 receives audio data from audio interface 210 in the alternative, or in addition to, the depicted data flow from the applications(s) 105 to the audio interface 210.

Figure 2:
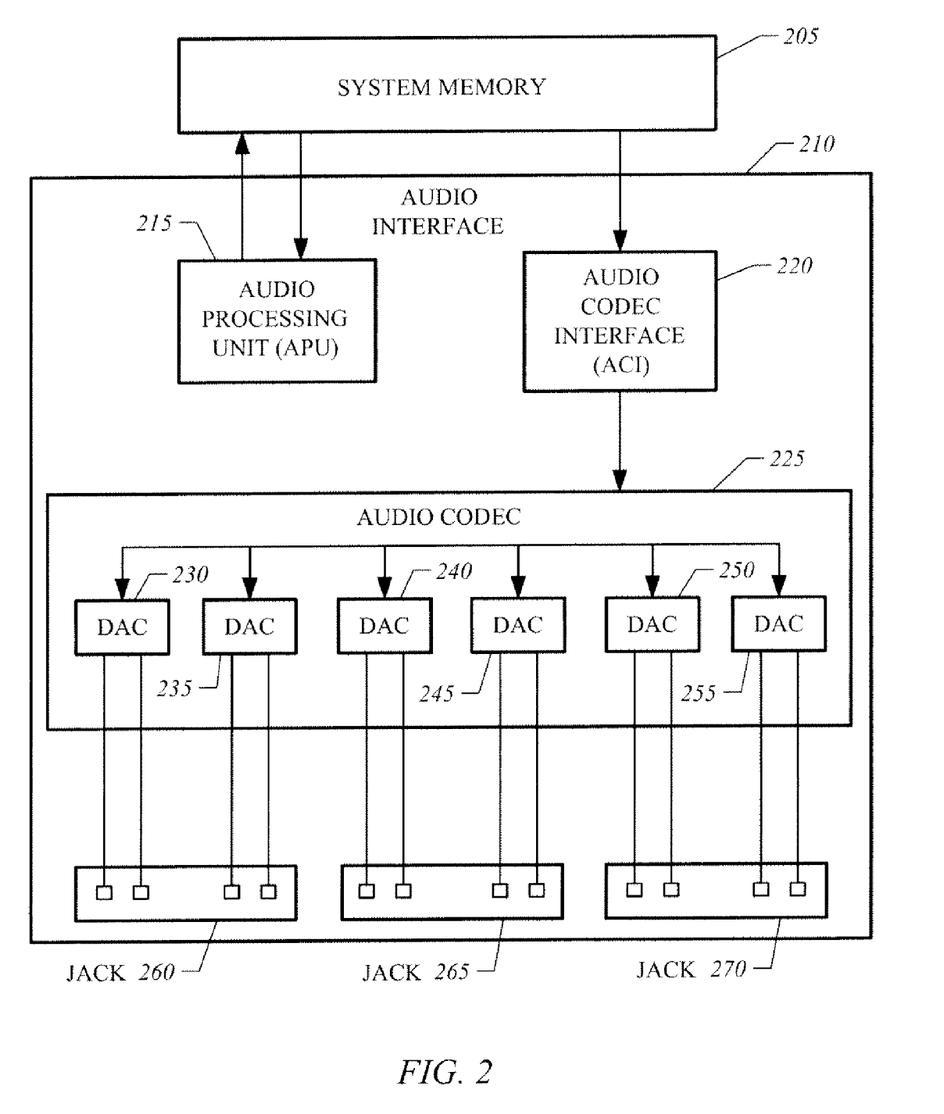
FIG. 2 is a block diagram of an audio interface, according to one embodiment of the invention.

FIG. 2 is a block diagram of audio interface 135, according to one embodiment of the invention. The audio interface 210 includes Audio Processing Unit (APU) 215, Audio Codec Interface (ACI) 220, audio codec 225, and output channel jacks 260, 265, and 270. Audio codec 225 further includes Digital-to-Analog Converters (DACs) 230, 235, 240, 245, 250 and 255.

APU 215 and ACI 220 are coupled to the system memory 205. Communications between the audio interface 210 and the system memory 205 may be enabled by protocol compatible with the Industry Standard Architecture (ISA), Peripheral Component Interconnect (PCI), HyperTransport bus, or other bus standard. ACI 220 is coupled to each of the DACs 230, 235, 240, 245, 250, and 255. In addition, each of the DACs 230, 235, 240, 245, 250 and 255 are coupled to a corresponding one of the jacks 260, 265, 270, 275, 280, and 285.

In operation, APU 215 reads audio data from system memory 205 and writes processed audio data to the system memory 205. Then, ACI 220 reads the processed audio data from system memory 205 and processes the data for the audio codec 225. Audio codec 225 converts the stream of digital audio data into three stereo channels of analog audio data. Processing in the APU 215 and ACI 220 will be described in more detail below.

Alternative embodiments of the audio interface 210 architecture may also be used according to design choice. For example, audio interface 210 may include a local memory, instead of, or in combination with the interface to system memory 205. Furthermore, there could be multiple APU's 215 and/or multiple ACI's 220. In addition, the functions of APU 215 and ACI 220 could be combined such that write back to the system memory 205 could be avoided. Some embodiments may use a Universal Serial Bus (USB) or other interface instead of, or in combination with, the ACI 220. Moreover, alternative numbers of DACs may be included in audio codec 225. In addition, audio codec 225 may further include one or more Analog-to-Digital Converters (ADCs) to convert received analog audio data to digital audio data for use in application(s) 105. In addition, although FIG. 2 depicts three stereo channel outputs (jacks 260, 265, and 270), other combinations of stereo and mono output channels could be used. Audio interface 210 may also include one or more digital input and/or digital output channels in the alternative, or in combination with, the analog output channels depicted in FIG. 2. Each of the functional elements depicted in FIG. 2 could be implemented in hardware, software, or a combination of hardware and software.

User Interaction

Figure 3:
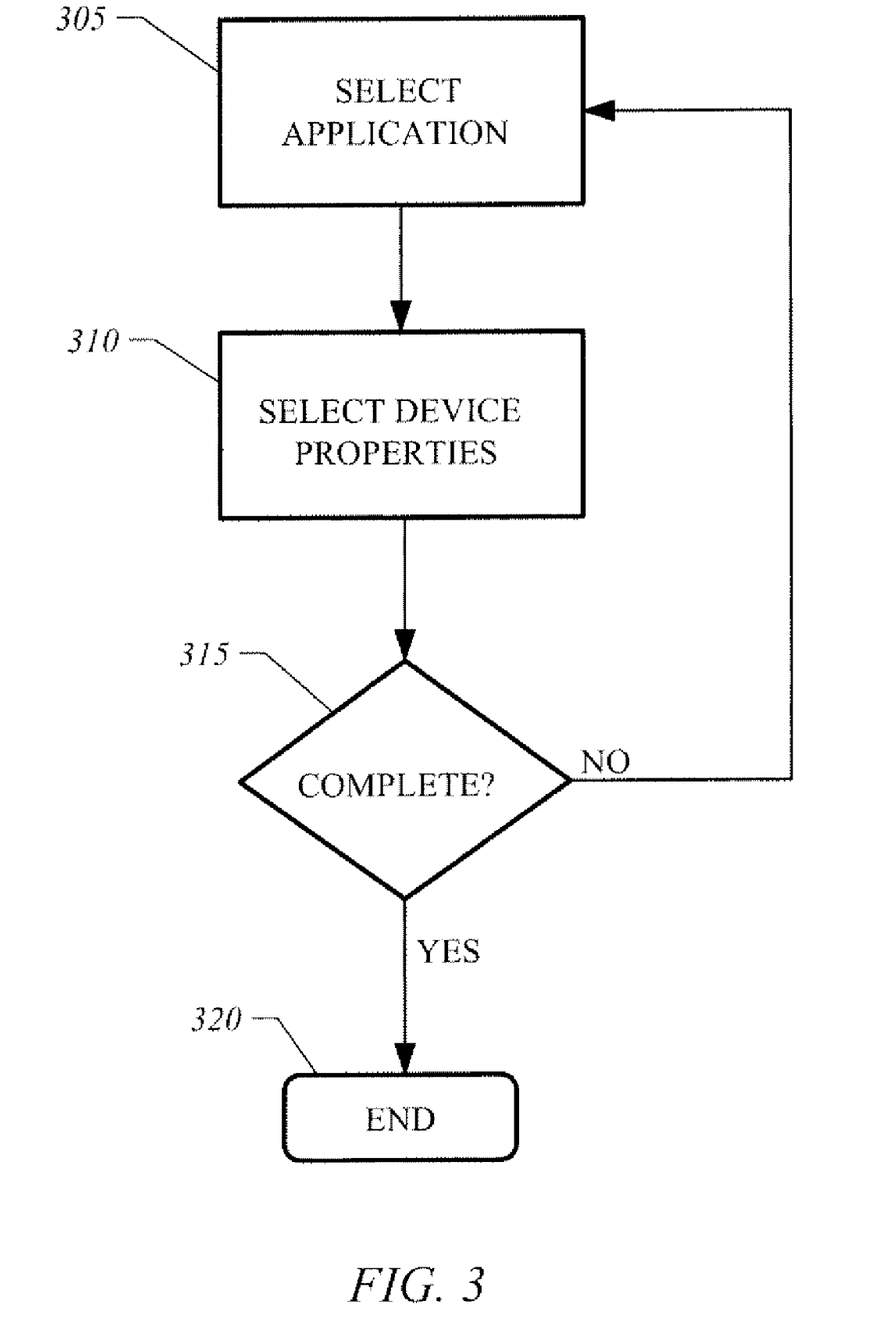
FIG. 3 is a flow diagram of a process for assigning audio data streams to output channels, according to one embodiment of the invention.

FIG. 3 is a flow diagram of a process for assigning audio data streams to output channels, according to one embodiment of the invention. As shown therein, a user first selects an application in step 305, and then selects device properties in step 310. Step 310 may be performed using a graphical user interface (GUI). If device properties have been selected for all applications, then it will be determined in conditional step 315 that the process is complete and the process will end in step 320. If, however, it is determined in conditional step 315 that device properties are to be assigned to audio data streams associated with other applications, then the process returns to step 305 to select a next application and select device properties associated with the next application in step 310.

In step 310, the device properties are associated to output channels, and a user may specify one or more output channels for an audio data stream by selecting from a list of virtual devices. For example, where an audio data stream is in stereo format, then it may be appropriate for a user to select two output channels (i.e., a left and a right channel) for outputting the audio data stream. Since the APU 215 supports the mixing of data streams from multiple applications, multiple applications may be assigned to a single device in step 310.

Figure 4:
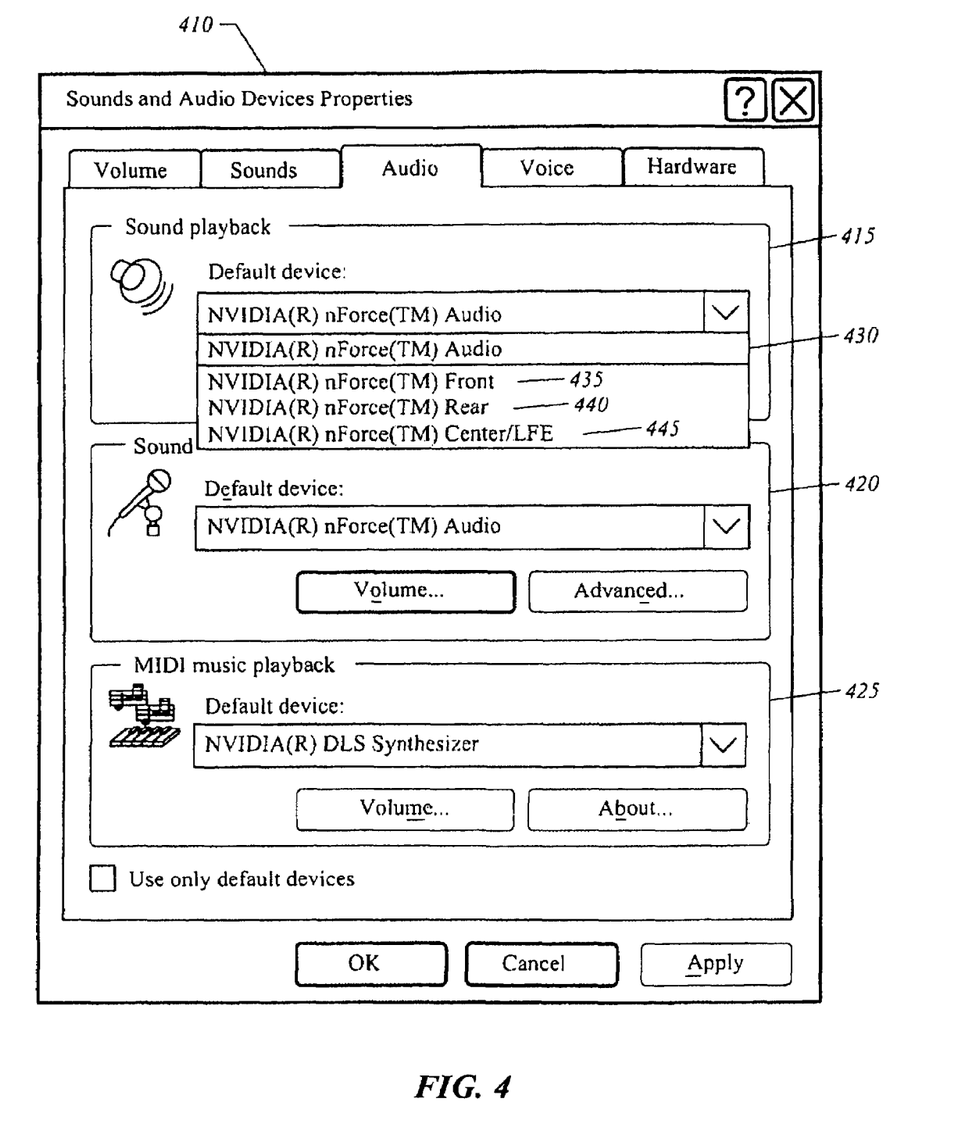
FIG. 4 is an illustration of a user interface for selecting device properties, according to one embodiment of the invention.

FIG. 4 is an illustration of a user interface for selecting device properties in step 310, according to one embodiment of the invention. As shown therein, a GUI 410 includes a sound playback section 415, a sound recording section 420 and a Musical Instrument Digital Interface (MIDI) playback section 425. Advantageously, the sound playback section 415 lists (presents, or exposes) multiple devices 430, 435, 440, and 445. A user may select one or more devices 430, 435, 440 and/or 445 to associate with the audio data stream of each application.

There are many alternatives for how the devices 430, 435, 440, and 445 are labeled in sound playback section 415. In one embodiment, the devices are listed with reference to sound card jacks. For example, with reference to FIGS. 2 and 4, device 430 could be associated with all output jacks (260, 265, and 270), device 435 could be associated with jack 260, device 440 could be associated with jack 265, and device 445 could be associated with jack 270. In another embodiment, devices are listed with reference to attached audio components. For instance, a device could be referred to as "right front speaker," "equalizer," or "tape recorder." In yet another embodiment, devices could be referred to the physical placement of input or output devices. For example, where a user has located speakers in different rooms of a house, the devices could be listed as "living room," "dining room," and "bed room." Other geographical locations could also be used. In one embodiment, the device names may be user defined. Combinations of the above embodiments may also be used.

Accordingly, the user interaction process of FIG. 3 can be enabled by the GUI depicted in FIG. 4 so that a user can associate audio data streams from one or more applications with output channels on a sound card or other audio interface. The user's selections are translated into API 110 calls from the application 105, which are sent to the virtual device drivers 115, 120, 125. The virtual device drivers 115, 120, 125 then uses the selections to program the APU 215 to correctly associate audio data stream inputs with the proper output devices, as will be described below.

System Operation

Figure 5:
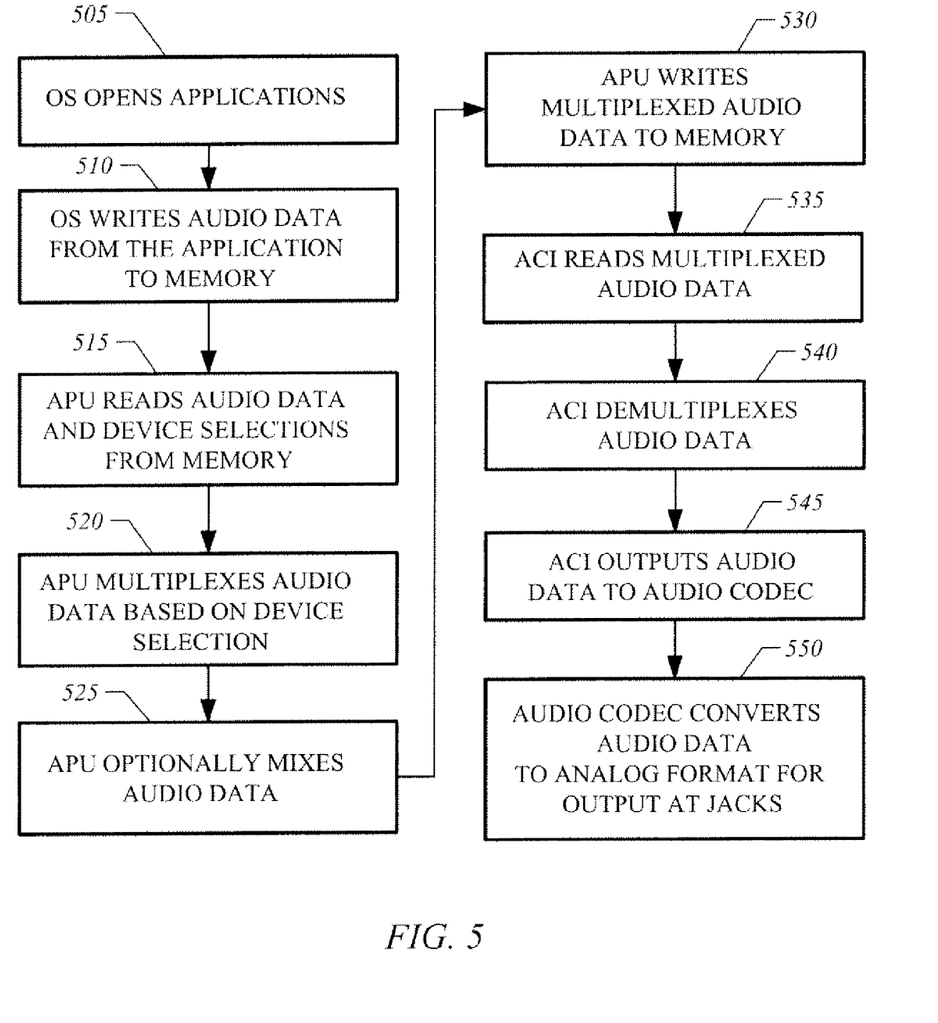
FIG. 5 is a flow diagram of a method for distributing audio data, according to one embodiment of the invention.

FIG. 5 is a flow diagram of a method for distributing audio data, according to one embodiment of the invention. As shown therein, the process begins when the operating system (OS) opens one or more applications in step 505. Then, in step 510, the OS writes audio data streams from the application(s) to memory (e.g., to system memory 130).

In step 515, the APU 215 reads the separate audio data streams and user's device selections from the system memory 130. In step 520, the APU 215 multiplexes the separate audio data streams from all open applications into a single audio data stream, where the sequence of audio data in the multiplexed stream is based on the device selections (this step is described in more detail below with reference to FIGS. 6A-6B). The APU 215 then optionally mixes the audio data in step 525, and writes the multiplexed audio data to system memory 130 in step 530.

The ACI 220 reads the multiplexed audio data stream from system memory 205 in step 535, demultiplexes the multiplexed audio data stream in step 540 before parsing and outputting the demultiplexed audio data to output channel jacks 260, 265, and/or 270 via audio codec 225 in step 545. In step 550, audio codec 225 converts the demultiplexed audio data from digital to analog format and provides output at jacks 260, 265, and/or 270.

The association of demultiplexed audio data streams with output channels in the ACI 220 (step 545) is according to a predetermined and fixed sequence. Thus, the user's device selection in step 310 is implemented by the APU 215 in step 520.

In alternative embodiments, the predetermined sequence used by the ACI 220 in step 545 is changeable. In Alternative embodiments, one or more functions described above as being performed by the APU 215 could be performed by the ACI 220. For instance, the APU 215 may also add echo, reverb, or other audio effects to the received audio data in step 520 before writing the multiplexed and otherwise processed audio data stream to the system memory 205 in step 530. Moreover, in one embodiment, the APU 215 and ACI 220 are combined into a single function, which may eliminate the need for steps 530 and 535. In still other embodiments, the audio codec 225 could perform functions described above with reference to the APU 215 and/or ACI 220. In addition, the sequence shown in FIG. 5 could be arranged. For example, in one embodiment, mixing step 525 can precede multiplexing step 520. Further, the method illustrated in FIG. 5 could be altered by having multiple APU stages 215 feed processed audio data to the ACI 220 for output.

Figure 6A:
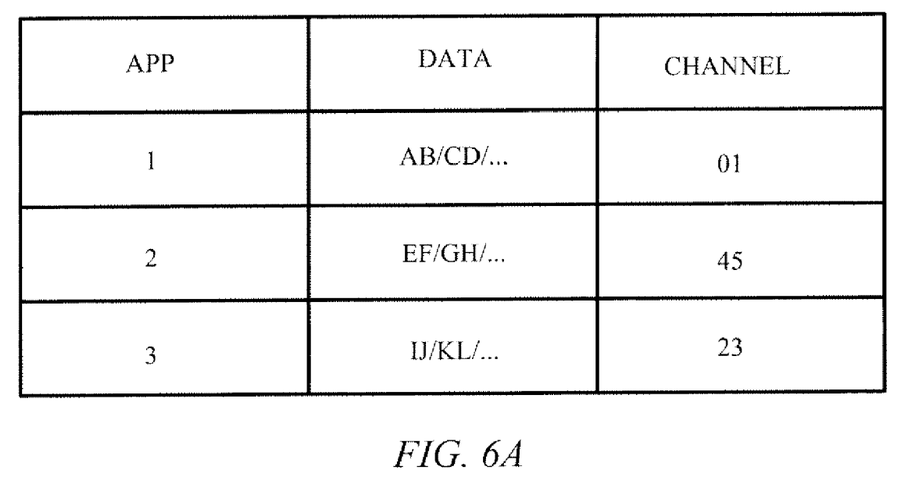
FIG. 6A is an illustration of a table that associates audio data streams with audio output channels, according to one embodiment of the invention.
Figure 6B:
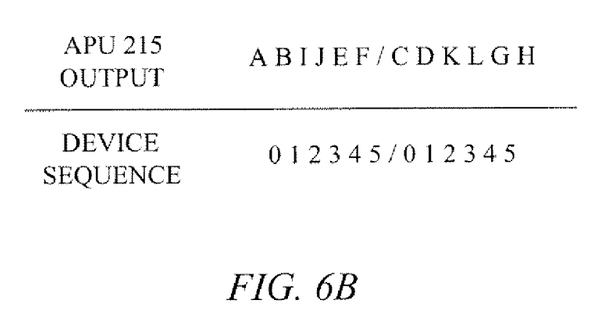
FIG. 6B is an illustration of a multiplexed data stream output from an audio processing unit based on the data shown in FIG. 6A, according to one embodiment of the invention.

FIGS. 6A and 6B provide an exemplary illustration of multiplexing step 520. FIG. 6A is an illustration of a table that associates audio data streams with audio output channels, according to one embodiment of the invention. As shown therein, each data stream is expressed in terms of data samples. For example, in the data stream associated with application 1, AB is a first data sample, and CD is a second data sample. The two digit channel code represents a two-channel pair, for example as would be specified for a stereo output. Thus, the bit stream in application 1 has been associated with channels 0 and 1 (shown as 01).

FIG. 6B is an illustration of a multiplexed data stream output from an audio processing unit based on the data shown in FIG. 6A, according to one embodiment of the invention. The output of APU 215 multiplexes the audio data streams from applications 1, 2, and 3 according to the assigned devices. The device sequence 012345/012345 indicates that individual audio data streams are being processed into a single multiplexed audio data stream having six channels (0-5).

Figure 7:
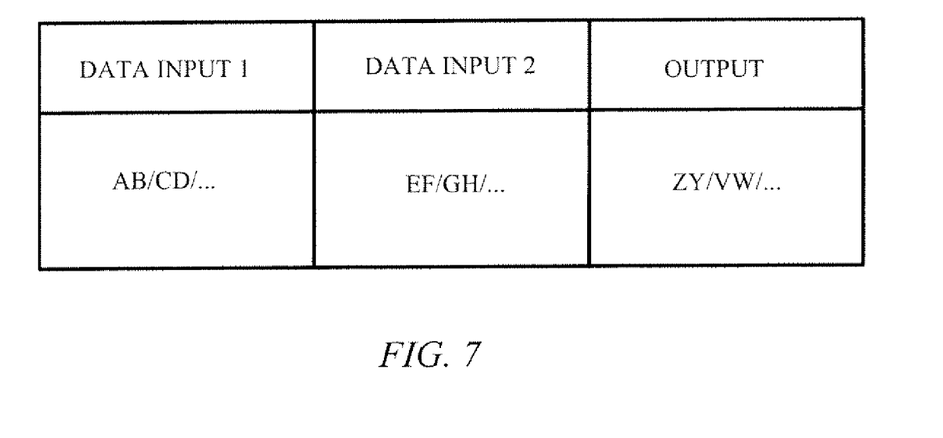
FIG. 7 is an illustration of samples from two audio streams that are mixed into a single audio stream, according to one embodiment of the invention.

FIG. 7 is an illustration of samples from two audio streams that are mixed into a single audio stream, according to one embodiment of the invention. As shown therein, data A and E are mixed to make Z, B and F are mixed to make Y, C and G are mixed to make V and D and H are mixed to make W. Accordingly, data from two different applications can be mixed by APU 215 to later output on a single channel.

Thus, FIGS. 3-7 describe a method for outputting audio data streams from one or more applications according to the predefined user selection of output channels. The architecture described with reference to FIGS. 1 and 2 can be configured to execute the processes described with reference to FIGS. 3-7. Moreover, the methods described with reference to FIGS. 3-7 can be embodied in computer-executable software, and the computer-executable software can be stored on a hard drive, in Random Access Memory (RAM), on a Computer Disc (CD), or in other computer-readable medium.

Embodiments of the invention described above thus overcome the disadvantages of known systems methods by enabling a user to assign different audio data streams to different output channels of a single audio card using substantially conventional APIs, device drivers, and Audio Codec Interfaces (ACIs). Embodiments of the invention provide an Audio Processing Unit (APU) to sequence audio data streams in accordance with a user's output channel assignment.

While this invention has been described in various explanatory embodiments, other embodiments and variations can be effected by a person of ordinary skill in the art without departing from the scope of the invention.

What is claimed is:

1. A method for using a single sound card to output audio data from a plurality of entertainment sources that include a media player and game software, comprising:

presenting a plurality of virtual devices to a user with each virtual device corresponding to a selection of a set of speakers from a group of speakers in different locations including speakers located in at least two different rooms, the presenting including displaying a list of the plurality of virtual devices on a graphical user interface;

receiving a first selection from the user associating a media player application with at least one of the plurality of virtual devices such that the first selection determines a first speaker assignment for the media player application;

receiving a second selection from the user associating a game software application with at least one of the plurality of virtual devices such that the second selection determines a second speaker assignment for the game software application; and using a plurality of virtual device drivers to write audio data streams for the media player application and the game software application into a system memory accessible by the single sound card and to program the single sound card to associate audio data streams of the media player application and the game software application with output audio channels based on the user's selections of virtual devices; and the single sound card operative to simultaneously output audio according to the first speaker assignment and the second speaker assignment with the single sound card performing any mixing required to output audio from the media player application and the game software application on one or more shared speakers.

2. The method of claim 1, wherein the different rooms includes different rooms in a house.

3. The method of claim 1, wherein the different locations of the group of speakers includes different positions within one room.

4. A method for using a single sound card to output audio data from a plurality of entertainment sources that include a video player and game software, comprising:

presenting a plurality of virtual devices to a user with each virtual device corresponding to a selection of a set of speakers from a group of speakers in different locations including speakers located in at least two different rooms, the presenting including displaying a list of the plurality of virtual devices on a graphical user interface;

receiving a first selection from the user associating a video player application with at least one of the plurality of virtual devices such that the first selection determines a first speaker assignment for the video player application;

receiving a second selection from the user associating a game software application with at least one of the plurality of virtual devices such that the second selection determines a second speaker assignment for the game software application; and using a plurality of virtual device drivers to write audio data streams for the video player application and the game software application into a system memory accessible by the single sound card and to program the single sound card to associate audio data streams of the video player application and the game software application with output audio channels based on the user's selections of virtual devices; and the single sound card operative to simultaneously output audio according to the first speaker assignment and the second speaker assignment with the single sound card performing any mixing required to output audio from the video player application and the game software application on one or more shared speakers.

5. The method of claim 4, wherein the at least two different rooms includes different rooms in a house.

6. The method of claim 4, wherein the different locations of the group of speakers includes different positions within one room of a house.

7. A method for using a single sound card to output audio data from a plurality of entertainment sources that include a media player and a video player, comprising:

presenting a plurality of virtual devices to a user with each virtual device corresponding to a selection of a set of speakers from a group of speakers in different locations including speakers located in at least two different rooms, the presenting including displaying a list of the plurality of virtual devices on a graphical user interface;

receiving a first selection from the user associating a media player application with at least one of the plurality of virtual devices such that the first selection determines a first speaker assignment for the media player application;

receiving a second selection from the user associating a video player application with at least one of the plurality of virtual devices such that the second selection determines a second speaker assignment for the video player application; and using a plurality of virtual device drivers to write audio data streams for the media application and the video player application into a system memory accessible by the single sound card and to program the single sound card to associate audio data streams of the media player application and the video player application with output audio channels based on the user's selections of virtual devices; and the single sound card operative to simultaneously output audio according to the first speaker assignment and the second speaker assignment with the single sound card performing any mixing required to output audio from the media player application and the video player application on one or more shared speakers.

8. The method of claim 7, wherein the at least two different rooms includes different rooms in a house.

9. The method of claim 7, wherein the different locations of the group of speakers includes different positions within one room.

\* \* \* \* \*